June 11, 1940.    J. V. RALSTON    2,204,105
BRAKE
Filed Dec. 21, 1938    2 Sheets-Sheet 1
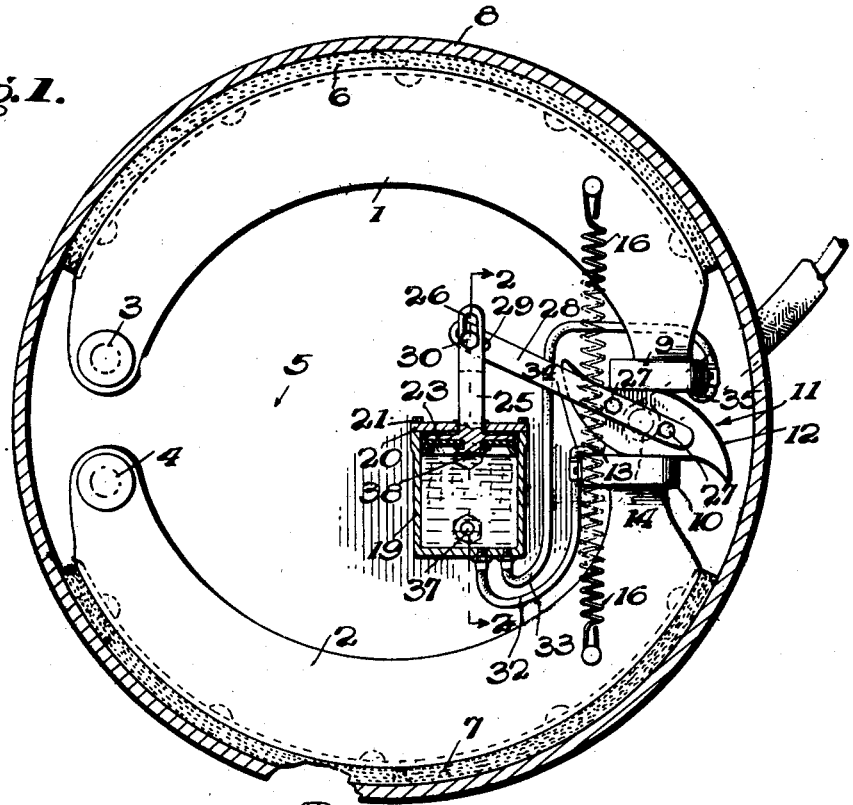
Inventor
James V. Ralston.
By N. D. Parker Jr.
Attorney June 11, 1940.　　　J. V. RALSTON　　　2,204,105
BRAKE
Filed Dec. 21, 1938　　　2 Sheets-Sheet 2

Inventor
James V. Ralston
By N. D. Parker Jr.
Attorney

Patented June 11, 1940

2,204,105

UNITED STATES PATENT OFFICE 2,204,105

BRAKE

James V. Ralston, Pittsburgh, Pa., assignor to Bendix-Westinghouse Automotive Air Brake Company, Pittsburgh, Pa., a corporation of Delaware Application December 21, 1938, Serial No. 247,123

11 Claims. (Cl. 188—1)

This invention relates to brakes and more particularly to a lubricating device for the brakes of automotive vehicles.

In automotive vehicle brake equipment heretofore utilized, equalized braking over substantially long periods of use has been difficult to achieve. Many factors are necessary to consider in attempts to secure equalized braking of all the wheels of a vehicle. One of the most important to take into consideration is that of lubrication of the movable parts of the brakes. Usually the parts of the brake requiring lubrication are so located that they are not as accessible as other parts of the vehicle and hence are not lubricated with sufficient frequence. Moreover, it has been found that, in the case of tractor-trailer trains, the lubrication of the trailer brake parts is often neglected. It will be readily understood that insufficient lubrication will result in great wear of the parts and consequent unequalized braking of the vehicle.

It is accordingly one of the objects of the present invention to provide a braking arrangement having a novel lubricating system which is so constituted as to overcome the above disadvantages.

Another object is to provide a lubricating arrangement for a braking system which will be so arranged as to relieve the operator of the necessity of manually lubricating the movable parts of the brakes.

Another object is to provide a novel brake lubricating device which will automatically operate to lubricate the brake parts during operation of the latter.

Still another object is to utilize, in a lubricating arrangement of the above character, the movement of the movable brake parts for automatically controlling the degree of lubrication.

Other objects and novel features of the invention will appear more fully hereinafter from the following detailed description when taken in connection with the accompanying drawings illustrating two embodiments of the invention. It is to be expressly understood, however, that the drawings are utilized for purposes of illustration only and are not designed as a definition of the limits of the invention, reference being had for this purpose to the appended claims.

In the drawings, wherein like numerals of reference indicate corresponding parts throughout the several views:

Fig. 1 represents a cross section taken through a brake assembly embodying the present invention;

Fig. 2 is a section taken on line 2—2 of Fig. 1;

Figure 3:
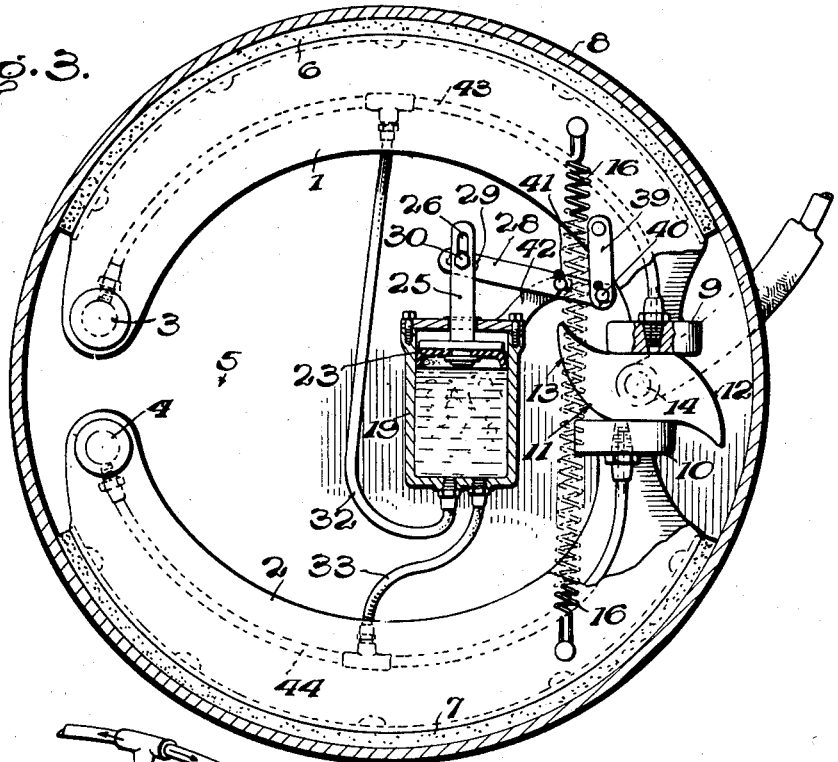
Fig. 3 represents a cross section similar to that of Fig. 1 but illustrating another modification of the invention.

Referring more particularly to Fig. 1 of the drawings, a brake assembly is illustrated therein as comprising brake shoes 1 and 2, each pivotally mounted on anchors 3 and 4 mounted on a backing plate 5. Each of the brake shoes is respectively provided with friction surfaces 6 and 7 for engaging the inside of a brake drum 8 whenever the brakes are applied. One end of each of the brake shoes 1 and 2 is provided with header plates 9 and 10 respectively. These header plates are adapted to be separated by a cam 11 having cam surfaces 12 and 13, the cam being rotatable about a bearing 14 in response to operation of the brakes by any suitable means not shown. A spring 16, each end of which is attached to the opposing brake shoes, tends to maintain the brakes in a released position.

Means are provided for automatically lubricating the movable brake parts in accordance with their operation. As shown, such means include a cylinder 19 for containing lubricant, said cylinder being attached to the backing plate 5 by a threaded boss 17, Fig. 2, and nut 18. A cylinder cover 20, having an opening 22 therein, is held in place by screws 21. Lubricant is expelled from the cylinder by means of a piston 23 suitably attached to one end of an arm 25. The other end of the arm is provided with a slot 26, the purpose of which will be more fully explained hereinafter. Attached rigidly to the side of the cam 11, by means of bolts 27, is a second arm 28 also having a slot 29 in its outer end. The two arms 25 and 28 are joined together, by means of bolt 30 working in the two slots 26 and 29 respectively, in such a manner as to provide a lost motion connection.

Communicating with the bottom of the cylinder 19 are flexible conduits 32 and 33 which terminate in nozzles 34 and 35 attached to the header plates 10 and 9 respectively. The outlets of these nozzles lie directly on the header plate surfaces which are contacted by the cam surfaces 12 and 13. Thus, when lubricant issues from these nozzles, the cam 11 and the surfaces of the header plates will be lubricated. If desired, additional conduits may be installed to furnish lubricant to the pivot pins 3 and 4.

In Fig. 2, the cylinder 19 is shown as being provided with an additional boss 36 projecting through the backing plate 5 and drilled and tapped to provide a grease nipple 37 for the purpose of filling the cylinder. An air vent 38 is provided in the threaded boss 17 to allow free movement of the piston and, in refilling, to indicate to the operator when the cylinder is full.

Figure 4:
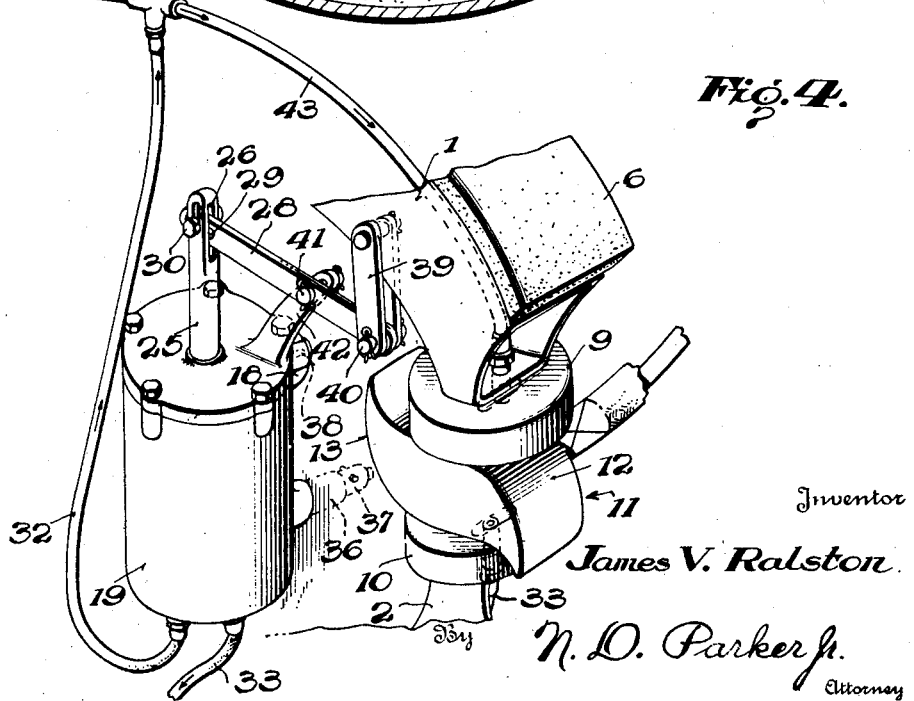
Fig. 4 is a perspective view, with parts broken away, of certain of the parts shown in Fig. 3.

Fig. 3 embodies a slightly different modification of the invention. The piston 23 of the cylinder 19 is connected to the brake shoe 1 through a linkage composed of arms 25, 28 and 39. The arms 25 and 28 are joined through the linkage providing lost motion as already described in connection with Fig. 1, while the arms 28 and 39 are joined by means of a pivot pin 40 as clearly shown in Fig. 4. The arm 28 fulcrums about the pivot 41 positioned in the end of an arm 42, connected with or formed integrally with the cylinder 19. Each of the flexible conduits 32 and 33 joins conduits 43 and 44, the latter pair constituting branch lines serving the cam surfaces and also the pivot pins and which may, if desired, be constructed of rigid material and attached to the brake shoes 1 and 2.

In the operation of the modification of Fig. 1, when the brake is operated by means of the conventional control not shown, the cam 11 rotates about its bearing 14 and causes the separation of the brake shoes and an application of brakes by means of the cam surfaces 12 and 13 contacting the header plates 9 and 10 carried by the brake shoes. Oscillating movement of the cam 11, through the arm 28, bolt 30 and arm 25, causes downward movement of piston 23. As such movement occurs, it will be understood that bolt 30 moves to the left in slot 29, as viewed in Fig. 1. The slot 26 permits the return movement of arm 28 without returning the piston 23 to its original position.

By way of illustration, assuming the lubricant container has been filled and that bolt 30 is positioned in the bottom of the slot 26, if the cam is rotated in a counterclockwise direction a given distance on the first operation of the brakes, lubricant will be expelled by the piston being forced down in the cylinder. On releasing the brakes, thereby moving the cam in a clockwise direction, bolt 30 will move upwardly in the slot 26 leaving the piston in its first brake applying position. If the cam is subsequently rotated through that same distance, no additional lubricant will be discharged because the piston is not advanced beyond its first position. If, at this point, the brake shoes have become worn or it is otherwise necessary to rotate the cam an additional distance in order to control the vehicle, then additional lubricant will be expelled in an amount proportional to the difference between the second position and the first. As the brake shoes continue to wear and the cam advances further in its turning movement, additional lubricant will be forced out of the cylinder. The travel of the piston in the cylinder is continually downward since the slot 26 is of a length greater than the thickness of the brake linings. This novel arrangement supplies only the desired amount of lubricant to the moving parts and prevents an excess accumulation which might impair the proper operation of the friction surfaces.

When new brake shoes are installed or adjustments made, or at other times, when desired, lubricant may be supplied to the cylinder by means of the grease nipple 37 shown in Fig. 2.

The operation of the modification as shown in Fig. 3 is similar to that of Fig. 1. In this arrangement, the piston 23 of cylinder 19 is connected to the brake shoe 1 and provision is made, by means of branch conduits 43 and 44, for lubricating the brake shoe pivot pins as well as the cam. Due to this arrangement, only the movement of the brake shoe 1 will cause the piston to lubricate the cam and pivot pins. As stated in the operation of Fig. 1, the amount of lubricant expelled in Fig. 3 will be in proportion to brake shoe movement and wear, thereby insuring a proper amount of lubricant upon the parts.

While the invention has been illustrated and described herein with considerable particularity, it is expressly understood that the same is not limited to the forms shown but may receive a variety of mechanical expressions. Reference will, therefore, be had to the appended claims for a definition of the limits of the invention.

What is claimed is:

1. A brake comprising a drum, a backing plate therefor, friction means mounted on said backing plate, a cam engaging said friction means for moving the latter into engagement with said drum, a lubricating device mounted on said backing plate adapted to lubricate said cam, and mechanical means including a lost motion device for connecting said friction means and lubricating device and operating the latter on movement of the friction means.

2. A brake comprising a drum, a backing plate therefor, friction means mounted on said backing plate, a cam engaging said friction means for moving the latter into engagement with said drum, a lubricating device mounted on said backing plate adapted to lubricate said cam, said lubricating device being so constructed and arranged as to lubricate said cam upon operation of said brake, and a mechanical connection between said lubricating device and cam for operating the device in response to movement of the cam in one direction.

3. A brake comprising a drum, a backing plate therefor, friction means mounted on said backing plate, a cam engaging said friction means for moving the latter into engagement with said drum, and a lubricating device mounted on said backing plate adapted to lubricate said cam, said lubricating device being so constructed and arranged as to expel lubricant on said cam upon operation of said brake in an amount substantially in proportion to the wear of said friction means.

4. A brake comprising a drum, a backing plate therefor, pivot pins carried by said backing plate, brake shoes pivotally mounted on said pivot pins, brake applying means for moving the brake shoes into engagement with the drum, and a lubricating device mounted on said backing plate, said lubricating device being so constructed and arranged as to expel lubricant on said pivot pins upon operation of said brake engaging means in an amount substantially in proportion to the wear of said brake shoes.

5. A brake lubricating device for a brake of the type having a drum, a backing plate, brake shoes mounted on the backing plate and a cam engaging the brake shoes for moving the latter into frictional engagement with the drum, comprising a lubricant container mounted on the backing plate, a piston movable in said container, means for conveying lubricant from said container to said cam, and means for actuating said piston upon operation of said cam.

6. A brake lubricating device for a brake of the type having a drum, a backing plate, brake shoes mounted on the backing plate and a cam engaging the brake shoes for moving the latter into frictional engagement with the drum, comprising a lubricant container mounted on the backing plate, a piston movable in said container, means for conveying lubricant from said container to said cam, and means connecting said piston and cam for actuating said piston upon operation of said cam.

7. A brake lubricating device for a brake of the type having a drum, a backing plate therefor, brake shoes mounted on the backing plate and brake engaging means for moving the latter into frictional engagement with the drum, comprising a lubricant container mounted on the backing plate, a piston movable in said container, means for conveying lubricant from said container to said brake engaging means, and means for actuating said piston upon operation of said brake engaging means.

8. A brake comprising a drum, a backing plate therefor, pivot pins carried by said backing plate, brake shoes pivotally mounted on said pivot pins, brake engaging means for moving the brake shoes into engagement with the drum, a lubricant container mounted on the backing plate, a piston movable in said container, means for conveying lubricant from said container to said pivot pins, and means for actuating said piston upon operation of said brake engaging means.

9. A brake comprising a drum, a backing plate therefor, pivot pins carried by said backing plate, brake shoes pivotally mounted on said pivot pins, brake engaging means for moving the brake shoes into engagement with the drum, a lubricant container mounted on the backing plate, a piston movable in said container, means for conveying lubricant from said container to said pivot pins, and means for actuating said piston upon operation of said brake engaging means to discharge a quantity of lubricant substantially in proportion to the wear of said brake shoes.

10. A lubricating device for a brake comprising a cylinder adapted to contain a lubricant and mounted on the brake, a piston in the cylinder, means for distributing the lubricant from the cylinder to the brake, and means for actuating said piston by operation of said brake to force lubricant from the cylinder in an amount substantially in proportion to brake wear.

11. In a brake of the type having friction means together with means for moving the friction means into frictional engagement with a drum, lubricating means for said moving means comprising a cylinder, a piston therein for forcing lubricant to said moving means, and means mechanically connecting said moving means and piston comprising a pair of levers connected together through a lost motion connection.

JAMES V. RALSTON.